United States Patent Office 3,405,035
Patented Oct. 8, 1968

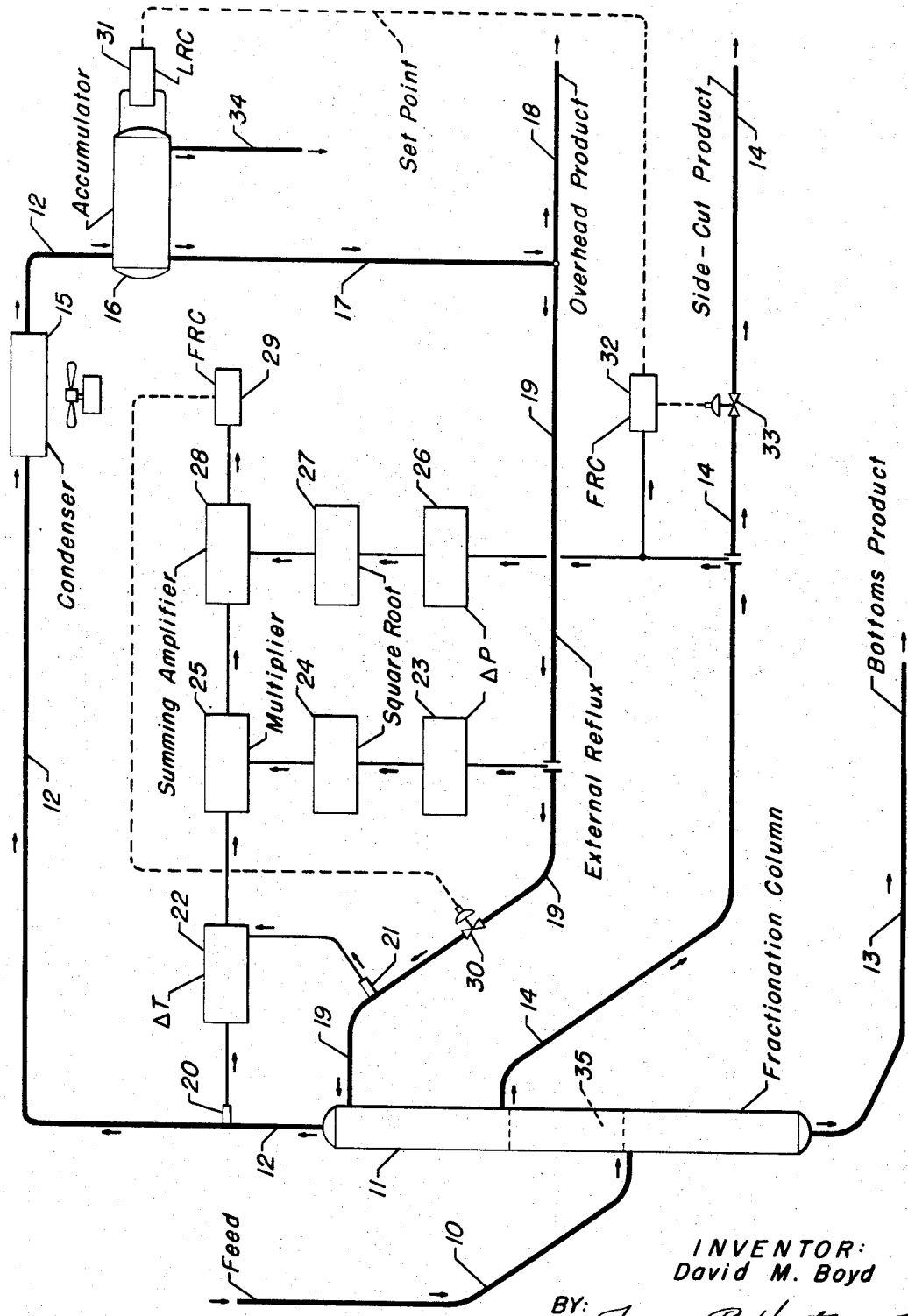

3,405,035
FRACTIONATOR SYSTEM WITH SIDE STREAM PRODUCT REMOVAL AND INTERNAL REFLUX CONTROL
David M. Boyd, Clarendon Hills, Ill., assignor to Universal Oil Products Company, Des Plaines, Ill., a corporation of Delaware
Filed Oct. 23, 1967, Ser. No. 677,190
3 Claims. (Cl. 202—160)

ABSTRACT OF THE DISCLOSURE

Method and system for controlling a fractionation column. The system utilizes calculated internal reflux rate for control and is uniquely applicable to fractionation columns taking an overhead product stream, a bottoms product stream, and at least one side-cut product stream. The side-cut product stream flow rate is taken into consideration in calculating the internal reflux.

Background of the invention

This invention relates to control systems for regulating the operation of fractionation columns. It specifically relates to control systems for regulating a fractionation column wherein an overhead fraction, a bottoms fraction, and at least one side-cut fraction is obtained as product streams.

It is well known in the prior art to separate fluid mixtures into individual component fractions according to boiling point differences utilizing fractionation means. These fractionation columns contain a number of contact devices such as perforated plates, bubble cap plates, ceramic packing and the like, in order to effectuate distillation. Typically, the fluid mixture to be separated is introduced into the column and heat is applied to the bottom of the column usually by conventional reboiler means in order to vaporize the liquid. The lowest boiling constituents are obtained as an overhead product and the heaviest boiling constituents are obtained as a bottoms or residue product. In some cases one or more intermediate boiling constituents are removed from the column as side-cut fractions. It is also conventional to return a portion of the condensed overhead material to the column as external reflux. The chemical engineering tool of distillation is well known and is used extensively in the petroleum and chemical industries to separate fluid mixtures.

Even though the principle of distillation is relatively simple and well understood the operation of such a column is frought with difficulty. For example, the column must be properly sized in order to provide space enough for proper contact between the various liquid and vapor streams within the column before effective separation can take place. Since commercial fractionating columns are generally large pieces of equipment there is inherent in the operation of such columns a considerable time lag between changes in operating conditions and noticeable changes in result from such changed conditions. In other words, if there is a change in the feed temperature there is a considerable time lag involved before the effect of such change can be detected in a corresponding change in the composition of one or more product streams. Once the composition change has been detected a corresponding counter change is made in the flow rate of such stream in order to compensate for the change in the feed temperature. This continuing cause and effect results in a rather unstable operation of the fractionating column and has prompted those skilled in the art to devise numerous control techniques for minimizing the instability of such columns.

Another significant difficulty in the operation of fractionation columns results from sudden changes in the ambient temperature surrounding the column which causes a corresponding abrupt change in the temperature of the overhead vapors from the column and/or the temperature of the external reflux added to the column. This difficulty has been magnified in recent years with the ever increasing use of fan coolers for condensing the overhead vapors. Sudden atmospheric temperature changes such as occur during a rain storm, for example, result in a sudden and significant lowering of the external reflux temperature. This causes an increase in the flow of liquid leaving the top tray because more of the vapor which enters this tray is condensed with a net result of increasing overhead product purity at the expense of a decreased overhead product rate.

The prior art solution to the problem of frequent changes in reflux temperature has been to devise control systems for computing the amount of internal reflux in the column and utilizing this computation for control purposes. Such a computation can be made from a measurement of the rate of flow of the external reflux and a measurement of the temperature differential between the external reflux returned to the column and a region near the top of the column such as the overhead vapor. Signals representative of these two measurements are combined so as to provide a measurement of the internal reflux in the column. Signals are also obtained for control purposes so as to maintain the internal reflux constant regardless of changes in external reflux rate and temperature.

However, this prior art internal reflux control system is not applicable to the control of fractionating columns which obtain side-cut fractions as product streams in addition to the conventional overhead system. In short, the prior art internal reflux computation means are not adaptable and cannot adequately control a fractionating column wherein at least one side-cut fraction is obtained as a product stream.

Summary of the invention

Accordingly, it is an object of this invention to provide improved fractionation column control systems which are based on internal reflux computation as well as side-cut product withdrawal rates.

It is a further object of this invention to provide a fractionation column control system wherein the internal reflux is maintained constant at a preselected value even though the rate of withdrawal of a side-cut fraction product stream may be varied over a relatively wide range.

Therefore, according to the present invention, in a fractionation zone wherein a fluid mixture to be separated is introduced into a fractionation column through a first conduit, vapors are removed from the upper portion of said column through a second conduit, liquid is removed from the lower portion of said column through a third conduit, at least one fluid is removed from an intermediate portion of said column through at least a fourth conduit, said vapors are at least partially condensed, and at least a portion of the condensate is returned to said column as external reflux through a fifth conduit, a control system for maintaining the internal reflux in said column substantially constant at a predetermined value which comprises first means to establish a first signal representing the quantity $[R_e(1+K\Delta T)]$ wherein $R_e$ represents the rate of flow of fluid in said fifth conduit, K is a constant, and $\Delta T$ is the differences in temperature of fluids in said second and said fifth conduits; second means to establish a second signal representing the rate of flow of fluid in said fourth conduit; third means for subtracting the quantity represented by said second signal from the quantity represented by said first signal; and fourth means responsive to said third means to adjust the rate of flow through said fifth conduit.

As used herein, the term "internal reflux" is intended to include the amount of external reflux returned to the column plus the amount of vapor which is condensed near the top of the column by supercooled external reflux. Those skilled in the art know well that if the internal reflux is maintained constant at the top of the fractionating column according to this definition then the internal reflux step by step down the column will similarly be maintained constant assuming constant molal overflow. It is important to note that the area of actual control within the fractionating columns contemplated by the present invention is that area between the feed introduction point and the side drawoff conduit in question or the area between any two product drawoff conduits. It is also important to note that the prior art internal reflux control systems are not flexible enough to take care of the condition of an additional side-cut product stream. Thus, in the prior art schemes if the amount of side-cut product is increased the internal reflux computer has no way of knowing how to compensate for this withdrawal of material and accordingly the internal reflux would correspondingly change in response to a temperature change at the top of the column. However, the time lag involved between the temperature change detected at the top of the column and the actual change in the withdrawal rate of the side-cut product would be so great as to render the fractionating column unstable and therefore generally unsuitable for most commercial practices.

Thus, it can be seen that the present invention provides a method whereby a change in the withdrawal rate of a side-cut product results in an immediate change in the rate of external reflux added so that the internal reflux within the column is thereby maintained constant at a predetermined value regardless of changes in the side-cut product withdrawal rate. In short, therefore, the practice of the present invention provides stability of operation not readily achievable by the control schemes of the prior art.

The invention may be readily understood from the following detailed description which is presented in conjunction with the accompanying drawing which is a schematic representation of apparatus for the practice of one embodiment of this invention.

Description of the drawing

Referring now to the drawing, there is shown a conventional fractionating column 11 which is provided with a number of vapor-liquid contact trays, not shown. It is desired for purposes of this description to maintain the internal reflux within the area shown as 35 substantially constant under the conditions imposed for fractionation. A suitable feed mixture to be separated into individual product streams is introduced into fractionating column 11 via line 10. Sufficient heat is supplied to the column for fractionation purposes by suitable reboiler means, not shown. An overhead vapor fraction comprising one product stream is withdrawn via line 12. A liquid bottoms product stream is withdrawn from the lower portion of column 11 via line 13. As an essential feature in the practice of this invention at least one side-cut product stream is withdrawn from an intermediate location via line 14; such location being at the top of the area wherein it is desired to maintain the internal reflux constant. The overhead vapors from the column in line 12 are condensed in fan cooler 15 and the resulting liquid therefrom is accumulated in vessel 16. The condensate is removed via line 17 and at least a portion of this condensate is returned via line 19 to column 11 as external reflux. If desired, a net over-heat product stream may be withdrawn from the system via line 18. Additionally, a contaminant product, such as water, may be withdrawn from accumulator 16 via line 34.

Referring now to the preferred embodiment of the control system, the amount of condensate in accumulator 16 is measured by level recorder controller 31 which activates control valve 33 via flow recorder controller 32 to maintain and control the return of withdrawal of the side-cut product stream in line 14.

The calculation of internal reflux at the top of the column, which if maintained constant will also render the internal reflux within the area 35 constant, is calculated by the well known heat and material balances across a given section of the column; in this instance the top tray of fractionator 11. Therefore, the material balance at the top of the fractionator can be expressed:

$$R_e + V_i = R_i + V_o \tag{1}$$

where:

$R_e$ = mass flow of liquid entering top tray (external reflux)
$V_i$ = mass flow of vapor entering top tray
$R_i$ = mass flow of liquid leaving top tray (internal reflux)
$V_o$ = mass flow of vapor leaving top tray.

The heat balance at the top tray can be expressed:

$$R_e h_e + V_i H = R_i h_i + V_o H \tag{2}$$

where:

$h_e$ = enthalpy of external reflux
$h_i$ = enthalpy of internal reflux
$H$ = enthalpy of vapor streams (assumed to be equal).

The enthalpy of the vapor streams entering and leaving the top tray can be expressed:

$$H = h_i + \lambda \tag{3}$$

where $\lambda$ is the heat of vaporization of liquid on the tray.

The enthalpy of the external reflux can be expressed:

$$h_e = h_i - C_p \Delta T \tag{4}$$

where:

$C_p$ = specific heat of the external reflux stream
$\Delta T$ = the difference in temperature between the top tray and external reflux.

Equation 3 can be substituted into Equation 2 to eliminate $H$ and rewritten:

$$V_i(h_i + \lambda) - V_o(h_i + \lambda) = R_i h_i - R_e h_e \tag{5}$$

Equation 4 can be substituted into Equation 5 to eliminate $h_e$ and rewritten:

$$(h_i + \lambda)(V_i - V_o) = h_i(R_i - R_e) + R_e C_p \Delta T \tag{6}$$

From Equation 1 it is known:

$$V_i - V_o = R_i - R_e \tag{7}$$

Equation 7 can be substituted into Equation 6 and reduced to obtain:

$$R_i = R_e \left(1 + \frac{C_p \Delta T}{\lambda}\right) \tag{8}$$

Equation 8 can be modified by substituting a constant $K$ for:

$$\frac{C_p}{\lambda}$$

and substituting in Equation 8 to obtain:

$$R_i = R_e(1 + K\Delta T) \tag{9}$$

In order to solve Equation 9 a differential pressure transmitter 23 is connected across an orifice in conduit 19 to establish a signal which is representative of the differential pressure across the orifice. This signal is applied to the input of a means 24 for establishing an output signal representative of the square root of the input signal. The output signal of means 24 which is thus representative of the flow $R_e$ through conduit 19 is applied to the first input of a multiplier 25. A first thermocouple 21 is disposed in conduit 19 and a second thermocouple 20 is disposed in conduit 12. These two thermocouples are connected to the input of a transducer which establishes a signal representative of the difference between the two temperatures sensed by the two thermocouples. As previously mentioned, since K is a constant, means 22 now calculates the term "$(1+K\Delta T)$" and develops an output signal therefrom. This signal is applied to the second input of multiplier 25. The output signal from multiplier 25 is thus equal to the term "$R_i$" of Equation 9.

However, as previously mentioned, a side-cut product fraction is being withdrawn via line 14 in accordance with the control demands of LRC 31. Accordingly, the rate of side-cut product withdrawal, $R_s$, must be taken into account. A differential pressure transmitter 26 is connected across an orifice in line 14 to establish a signal which is representative of the differential pressure across the orifice. This signal is supplied to the input means 27 for establishing an output signal representative of the square root of the input signal. The output signal of means 27 which is thus representative of the flow $R_s$ through conduit 14 is applied to the first input of a summing amplifier 28. As previously mentioned, the output signal from multiplier 25 is now applied to the second input of summing amplifier 28. The calculations performed by amplifier 28 results in the subtraction of the quantity $R_s$ from the quantity represented by the signal from multiplier 25, thereby establishing a signal from amplifier 28 representing the solution to the following equation:

$$R_{iL} = R_e(1+K\Delta T) - R_s \qquad (10)$$

wherein $R_{iL}$ is the internal reflux in area 35.

The solution to Equation 10 represents a signal which provides input to flow recorder controller 29 which in turn activates control 30 for adjusting the rate of external reflux flowing in conduit 19.

In actual operation, therefore, if the rate of withdrawal of side-cut product in line 14 increases, appropriate calculations will be made so that there will be a corresponding immediate increase in the amount of external reflux added to the column via line 19. Conversely, if the rate of side-cut product withdrawal is decreased there will be a corresponding immediate decrease in the amount of external reflux being added via line 19. The net effect of this system, therefore, is to maintain the rate of internal reflux within the column at a predetermined substantially constant value.

The components of the control system are well known to those skilled in the art. The various transmitters, square root means, multipliers and controllers are available commercially from any number of reputable instrument manufacturers.

The above control system is uniquely applicable to the control of a benzene column which is used to recover benzene in high concentration and purity from a conventional solvent extraction step. Suitable operating conditions for such a column would include a feed temperature of about 248° F. with overhead vapors being removed from the column at about 195° F. Reflux to the column is returned at a temperature of about 150° F. The side-cut product is removed from the column at a temperature of from 185° F. to 195° F. and the resid material is removed from the column at a temperature of about 305° F. The side-cut fraction comprising benzene has a purity in excess of 99.9%. A typical column would contain approximately 54 fractionating trays with the feed tray typically being at tray location 30, the side-cut withdrawal rate being typically at tray location 5 and reflux being returned to the tower at tray location 1. Usually, water is removed as a contaminant from accumulator 16 via line 34, as previously mentioned.

Preferred embodiment

Therefore, from the foregoing, a preferred embodiment of the present invention includes a fractionation zone wherein a fluid mixture to be separated into a selected number of individual product streams is introduced into a fractionation column through a first conduit, vapors are removed from the upper portion of said column through a second conduit, liquid is removed from the lower portion of said column through a third conduit, fluid is removed from an intermediate portion of said column through a fourth conduit, said vapors are at least partially condensed, and at least a portion of the condensate is returned to said column as external reflux through a fifth conduit, a control system for maintaining the internal reflux in the upper portion of said column substantially constant at a predetermined value which comprises first means to establish a first signal representing the rate of flow of external reflux in said fifth conduit, second means to establish a second signal representing the rate of flow of said fluid in said fourth conduit, third means cooperatively connected to said second and fifth conduits to establish a third signal representing the quantity $(1+K\Delta T)$ wherein K is a constant and $\Delta T$ is the difference in temperature of fluids in said second and fifth conduits, fourth means responsive to said first and third means to establish a fourth signal representing the quantity of said first signal multiplied by said third signal, fifth means for subtracting the quantity represented by said second signal from the quantity represented by said fourth signal, and sixth means responsive to said fifth means to adjust the rate of flow through said fifth conduit.

A still further preferred embodiment of this invention includes the system hereinabove further comprising means responsive to the rate of accumulation of said condensate to adjust the flow of the rate of fluid through said fourth conduit.

The invention claimed:

1. In a fractionation system wherein a fluid mixture to be separated is introduced into a fractionation column through a first conduit, vapors are removed from the upper portion of said column through a second conduit, liquid is removed from the lower portion of said column through a third conduit, at least one fluid is removed from an intermediate portion of said column through at least a fourth conduit, said vapors from the upper portion of the column are at least partially condensed, and at least a portion of the condensate is returned to said column as external reflux through a fifth conduit, a control system for maintaining the internal reflux in said column substantially constant at a predetermined value which comprises first means to establish a first signal representing the quantity $[R_e(1+K\Delta T)]$ wherein $R_e$ represents the rate of flow of fluid in said fifth conduit, K is a constant, and $\Delta T$ is the difference in temperature of fluids in said second and fifth conduits; second means to establish a second signal representing the rate of flow of fluid in said fourth conduit; third means for subtracting the quantity represented by said second signal from the quantity represented by said first signal; and fourth means responsive to said third means to adjust the rate of flow through said fifth conduit.

2. In a fractionation system wherein a fluid mixture to be separated into a selected number of individual product streams is introduced into a fractionation column through a first conduit, vapors are removed from the upper portion of said column through a second conduit, liquid is removed from the lower portion of said column through a third conduit, fluid is removed from an intermediate portion of said column through a fourth conduit, said vapors from the upper portion of the column are at least partially condensed, and at least a portion of the condensate is returned to said column as external reflux through a fifth conduit, a control system for maintaining the internal reflux in the upper portion of said column substantially constant at a predetermined value which comprises first means to establish a first signal representing the rate of flow of external reflux in said fifth conduit, second means to establish a second signal representing the rate of flow of said fluid in said fourth conduit, third means cooperatively connected to said second and fifth conduits to establish a third signal representing the quantity $(1+K\Delta T)$ perature of fluids in said second and fifth conduits, fourth wherein K is a constant and ΔT is the difference in temperature means responsive to said first and third means to establish a fourth signal representing the quantity of said first signal multiplied by said third signal, fifth means for subtracting the quantity represented by said second signal from the quantity represented by said fourth signal, and sixth means responsive to said fifth means to adjust the rate of flow through said fifth conduit.

3. System according to claim 2 further comprising means responsive to the rate of accumulation of said condensate to adjust the rate of flow of fluid through said fourth conduit.

References Cited

UNITED STATES PATENTS

| | | | |
|---|---|---|---|
| 2,476,010 | 7/1949 | Whittlesey | 208—358 |
| 2,534,870 | 12/1950 | Kraft | 208—358 |
| 3,020,213 | 2/1962 | Lupfer | 196—132 |
| 3,212,997 | 10/1965 | Walker | 203—2 |
| 3,331,753 | 7/1967 | Foester et al. | 203—2 |
| 3,365,386 | 1/1968 | Van Pool | 196—132 |

WILBUR L. BASCOMB, JR., *Primary Examiner.*